C. F. JACOBSEN,
Assignor of one-half to I. P. FRINK.
CHANDELIER.
No. 10,008. Reissued Jan. 10, 1882.
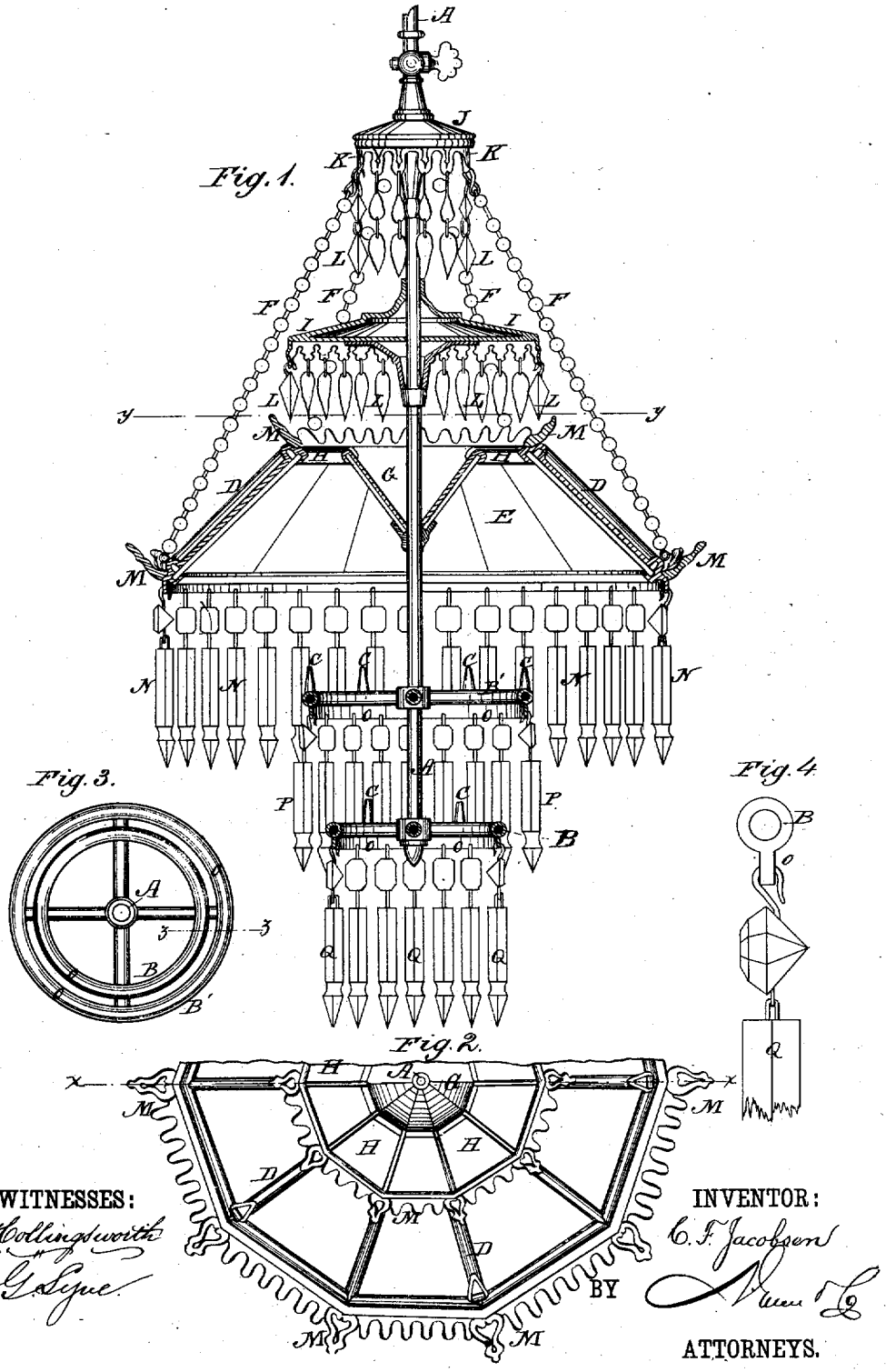
WITNESSES:
W. W. Hollingsworth
A. G. Lyne
INVENTOR:
C. F. Jacobsen
BY
ATTORNEYS.
N. PETERS, Photo-Lithographer, Washington, D. C.

UNITED STATES PATENT OFFICE.

CHARLES F. JACOBSEN, OF NEW YORK, N. Y., ASSIGNOR OF ONE-HALF TO ISAAC P. FRINK, OF NEWARK, NEW JERSEY.

CHANDELIER.

SPECIFICATION forming part of Reissued Letters Patent No. 10,008, dated January 10, 1882.

Original No. 91,135, dated June 8, 1869. Application for reissue filed April 19, 1881.

*To all whom it may concern:*

Be it known that I, CHARLES F. JACOBSEN, of the city, county, and State of New York, have invented a new and useful Improvement in Chandeliers; and I do hereby declare that the following is a full, clear, and exact description of the same, reference being had to the accompanying drawings, forming part of this specification, in which—

Figure 1 is a detailed vertical section of my improved apparatus. Fig. 2 is a horizontal section of the same, taken through the line *y y*, Fig. 1. Fig. 3 is a bottom view of the burner-rings, the pendants being removed. Fig. 4 is a detail cross-section of one of the rings, taken through the line *z z*, Fig. 3.

Similar letters of reference indicate corresponding parts.

My invention has for its object to furnish an improved double-cone reflecting-chandelier, for use in churches, theaters, parlors, and other public and private buildings, which shall be so constructed and arranged as to light the ceiling and walls as well as the floor and body of the room, and which shall be so constructed as to soften the light, destroying its glare and diffusing it agreeably through the room, and at the same time be highly ornamental; and it consists in the construction and combination of various parts of the chandelier and means for protecting the silvered surface to prevent injury from the action of air, moisture, or heat.

A represents a gas pipe or rod from the ceiling, for supporting the chandelier. To the lower end of the pipe or rod is attached a circular pipe or ring, B, of suitable size, to which the burners C are attached. At a little distance above the ring B is placed another ring, B′, of similar construction, to which, also, burners C are attached. More than two rings, B B′, may be used, if desired, placed the one above the other at suitable distances apart, the upper ring in each case being made larger than the next preceding lower ring, so that the flames and the upward currents of air caused by said flames may not interfere with each other.

D E is the outer reflector, which is made in the form of a truncated polygonal pyramid, the part D of which, that forms the frame or foundation of the reflector, is made of sheet metal, struck up to form ribs or beading surrounding sunken or raised parts or panels, as shown in Figs. 1 and 2. This construction strengthens the reflector D and guards against it getting out of shape, and thus allowing the glass E to drop out—an accident which has frequently happened with reflectors constructed in the ordinary manner, to the imminent danger of those in the room. This construction at the same time makes the reflectors highly ornamental. The raised or sunken parts or panels may be made curved or flat, corrugated or plain, as may be desired. The interior part, E, is formed of glass coated with nitrate of silver, in the usual manner. This coating is then covered with a liquid solution of shellac to protect it from injury from the atmosphere, while a cement composed of such dry pigments as plaster-of-paris, oxide of zinc, and varnish, in the proportions of one part of each of the former ingredients to two of the latter, is flowed on with a soft brush. When dry, this cement will resist, without perceptible injury to it, a temperature of at least 500° Fahrenheit, and it is equally well adapted to withstand any injurious effects from moisture. The reflector D E is supported by chains F, the upper ends of which are attached to the rod or pipe A, or to a canopy attached to said pipe or rod.

G is the interior reflector, which is made in the form of an inverted polygonal pyramid, through the apex of which the rod or pipe A passes, and which is supported from the upper edge of the outer reflector, D E, by the rods or arms H, the ends of which are attached to the upper edges of the reflectors D E and G. The reflector G is formed by attaching glass plates, silvered as hereinbefore described, to a metallic foundation or frame.

I is a canopy, made somewhat in the shape of a flattened cone, through the apex of which the rod or pipe A passes, and which rests upon and is supported by a collar formed upon or attached to the said pipe or rod A, as shown in Fig. 1. At a suitable distance above the canopy I is placed another canopy, J, which is securely attached to the pipe or rod A, so that the reflector may be supported from it by means of the chains F, as shown in Fig. 1. The edges of the canopies I and J are furnished with raised or struck-up borders or bands K, which incline downward, and have holes formed through them to receive the hooks of the glass pendants L. The canopies I and J, with their raised borders and glass pendants, thus become highly-ornamental attachments to the chandeliers.

The lower and upper edges of the reflector D E are, in addition to the beading, provided with suitable border or bands, M, for the purpose of ornamenting or stiffening the reflector. From the lower edge of the outer reflector, D E, are suspended glass pendants N, which I prefer to make in the form of prisms, and which are of such a length as to surround the burners of the upper ring, B′. Upon the rings B′ B are formed, or to them are attached, flanges or bands O, from which are suspended glass pendants P and Q, the pendants P being so arranged as to surround the burners of the lower ring. By this arrangement of the pendants the light will be so refracted in its passage through said pendants as to be deprived of its glare and flicker, and be so softened as to be agreeable to the eye, while at the same time fully lighting up the walls and ceiling, and, in fact, all parts of the room.

In places not supplied with gas the rings B′ B may be made large, and may be supplied with kerosene-burners and with chimneys to adapt the chandeliers for burning kerosene or other illuminating-oil.

Having thus described my invention, what I claim as new is—

1. The combination of two or more burner-rings, B B′, placed the one above the other, with the pipe or rod A and reflector D E G, substantially as herein shown and described, and for the purpose set forth.

2. The rings B B′, provided with the flanges O O, to receive and support the glass pendants, as herein shown and described, for the purpose set forth.

3. In combination with the reflector D E, having struck-up edges or beading and flanges for holding the glass, the borders or bands M, said bands being designed for stiffening and ornamenting the reflector, substantially as and for the purpose described.

4. The panels in the outer part of the reflector D E, surrounded by beads or ribs, substantially as and for the purpose described.

5. A silver-coated glass reflector, made water, air, and heat proof by cement, substantially of the nature described.

6. As a means of protecting the silver-covered surface of glass for reflectors against air, heat, and moisture, the shellac or varnish coating covered with a cement composed of plaster-of-paris, oxide of zinc, and varnish, substantially as set forth.

7. A silver-coated glass reflector provided on its back with an air, moisture, and heat proof covering, consisting of a cement composed of dry pigments and varnish, substantially as and for the purpose specified.

8. The combination of the two canopies I and J, provided with borders or bands K and pendants L, with the rod or pipe A and polygonal and pyramidal reflectors D E G, substantially as herein shown and described, and for the purpose set forth.

9. The combination and arrangement of the rod or pipe A, rings B B′, provided with burners, polygonal and pyramidal reflectors D E G, chains F, canopies I J, provided with raised borders K and pendants L, and pendants N P Q, with each other, substantially in the manner herein shown and described, and for the purpose set forth.

CHAS. F. JACOBSEN.

Witnesses:
A. G. LYNE,
SOLON C. KEMON.